(12) United States Patent
Romanowski et al.

(10) Patent No.: US 10,100,644 B2
(45) Date of Patent: Oct. 16, 2018

(54) SPINNER FOR A GAS TURBINE ENGINE

(71) Applicant: Rolls-Royce Corporation, Indianapolis, IN (US)

(72) Inventors: Erin M. Romanowski, Avon, IN (US); Eric W. Engebretsen, Zionsville, IN (US); Matthew A. Scott, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 415 days.

(21) Appl. No.: 14/635,412

(22) Filed: Mar. 2, 2015

(65) Prior Publication Data

US 2016/0010459 A1    Jan. 14, 2016

Related U.S. Application Data

(60) Provisional application No. 61/947,084, filed on Mar. 3, 2014.

(51) Int. Cl.
| | |
|---|---|
| *F01D 5/12* | (2006.01) |
| *F02C 3/04* | (2006.01) |
| *F02C 7/04* | (2006.01) |
| *F01D 5/06* | (2006.01) |

(52) U.S. Cl.
CPC ............ *F01D 5/12* (2013.01); *F01D 5/066* (2013.01); *F02C 3/04* (2013.01); *F02C 7/04* (2013.01); *F05D 2300/603* (2013.01); *F05D 2300/6012* (2013.01); *Y02T 50/672* (2013.01); *Y02T 50/673* (2013.01)

(58) Field of Classification Search
CPC .............. F01D 5/12; F01D 2300/603; F01D 2300/6012; F02C 3/04; F02C 7/04; F02C 7/05; B64C 11/14; B64C 23/02; Y02T 50/672; Y02T 50/673; F05D 2300/6012; F05D 2300/603
USPC ...................................................... 416/245 R
See application file for complete search history.

(56) References Cited

U.S. PATENT DOCUMENTS

| | | | |
|---|---|---|---|
| 3,115,271 A | 12/1963 | Anderson et al. | |
| 4,140,433 A * | 2/1979 | Eckel .................. | F03D 1/04 290/55 |
| 4,624,820 A | 11/1986 | Barraclough | |
| 4,780,262 A | 10/1988 | Vonvolkli et al. | |
| (Continued) | | | |

FOREIGN PATENT DOCUMENTS

| | | |
|---|---|---|
| DE | 102010005987 A1 | 2/2011 |
| DE | 102010005986 A1 | 6/2011 |
| | (Continued) | |

OTHER PUBLICATIONS

European Search Report and Written Opinion, European Patent Application No. 15157225.2-1607, dated Jul. 27, 2015, 7 pages.

(Continued)

*Primary Examiner* — Ninh H Nguyen
*Assistant Examiner* — Jason Davis
(74) *Attorney, Agent, or Firm* — Barnes & Thornburg LLP

(57) ABSTRACT

A spinner for use in a gas turbine engine includes a body and an aft ring coupled to the body. The body is symmetrically formed by filament winding around a central axis. The aft ring includes a band coupled to the body and a plurality of fairings that extend outward in a radial direction from the band away from the central axis.

14 Claims, 10 Drawing Sheets

(56) References Cited

U.S. PATENT DOCUMENTS

| | | |
|---|---|---|
| 4,957,415 A | 9/1990 | Paul et al. |
| 5,252,160 A | 10/1993 | Scanlon et al. |
| 5,588,392 A | 12/1996 | Bailey |
| 6,358,014 B1 | 3/2002 | Chou et al. |
| 6,447,255 B1* | 9/2002 | Bagnall .................. F01D 5/066 277/626 |
| 8,251,670 B2 | 8/2012 | Anghileri |
| 8,540,492 B2 | 9/2013 | Schreiber |
| 8,677,622 B2* | 3/2014 | Schreiber .............. F04D 29/321 29/889.2 |
| 2008/0022524 A1 | 1/2008 | Schreiber |
| 2010/0258199 A1 | 10/2010 | Schreiber |
| 2011/0103726 A1* | 5/2011 | Xie ........................... F01D 5/06 384/295 |
| 2012/0134843 A1 | 5/2012 | Bottome et al. |
| 2012/0134844 A1 | 5/2012 | Bottome |
| 2013/0202449 A1* | 8/2013 | Lombard ................ F01D 5/02 416/244 R |
| 2013/0255277 A1 | 10/2013 | Macchia et al. |
| 2014/0186166 A1* | 7/2014 | Kostka ................... F01D 5/146 415/182.1 |
| 2014/0255204 A1 | 9/2014 | Totten et al. |

FOREIGN PATENT DOCUMENTS

| | | |
|---|---|---|
| EP | 0031785 A1 | 7/1981 |
| EP | 0850831 A2 | 7/1998 |
| EP | 1016588 A2 | 7/2000 |
| EP | 2458146 A1 | 5/2012 |
| GB | 2363170 A | 12/2001 |
| GB | 2398353 A | 8/2004 |

OTHER PUBLICATIONS

European Office Action, European Application No. 15157225.2-1607, dated Oct. 24, 2017, 4 pages.

* cited by examiner

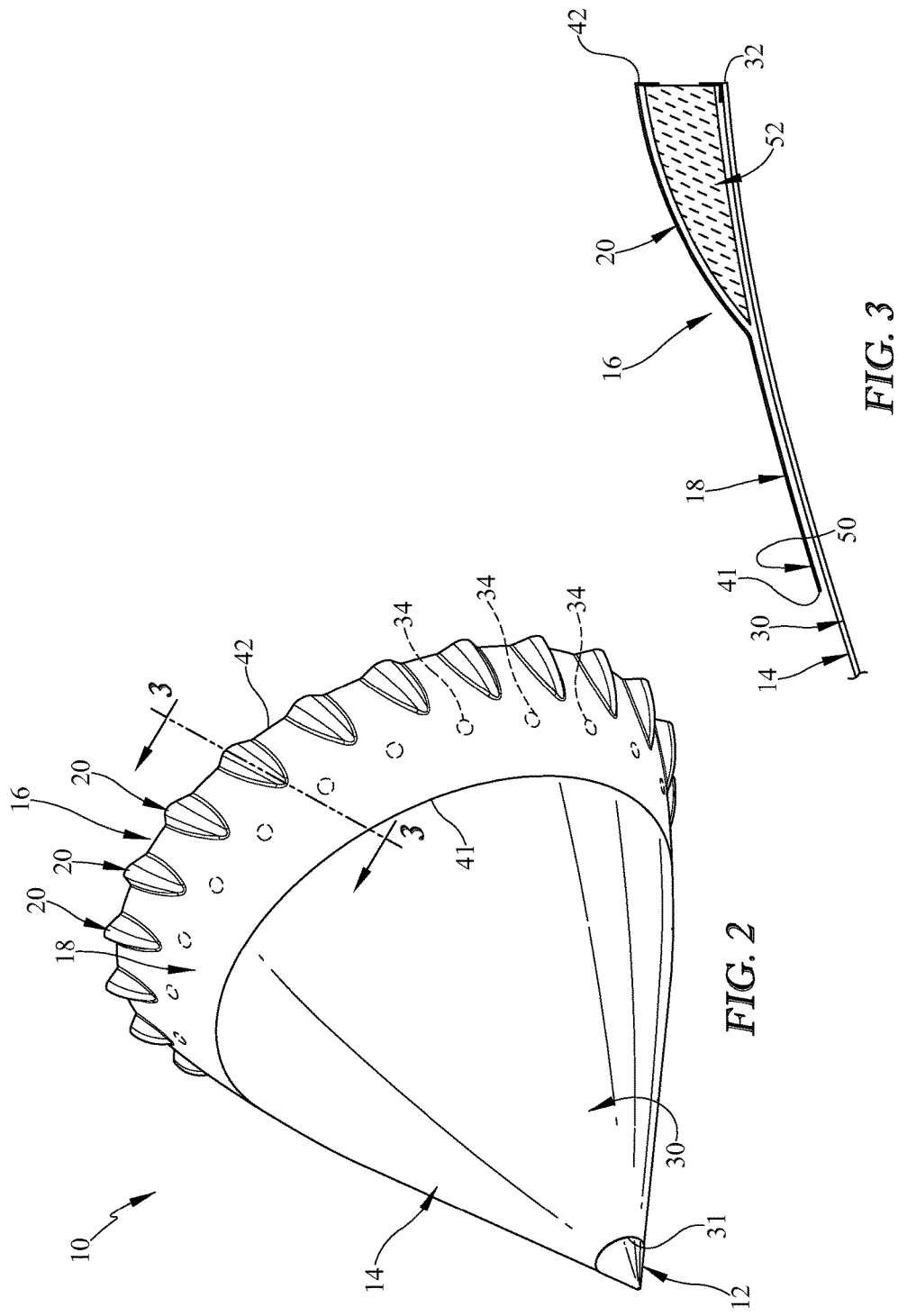

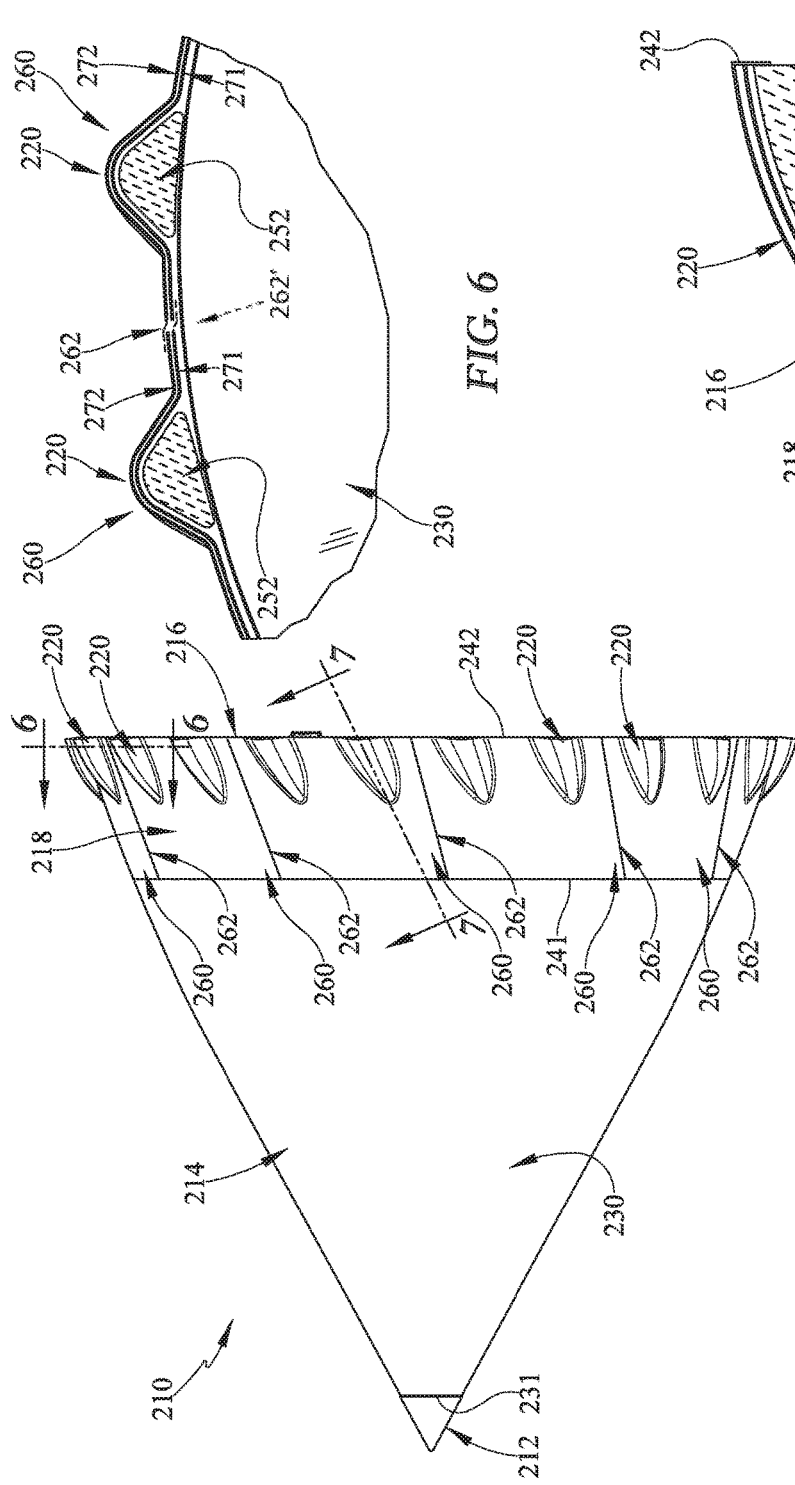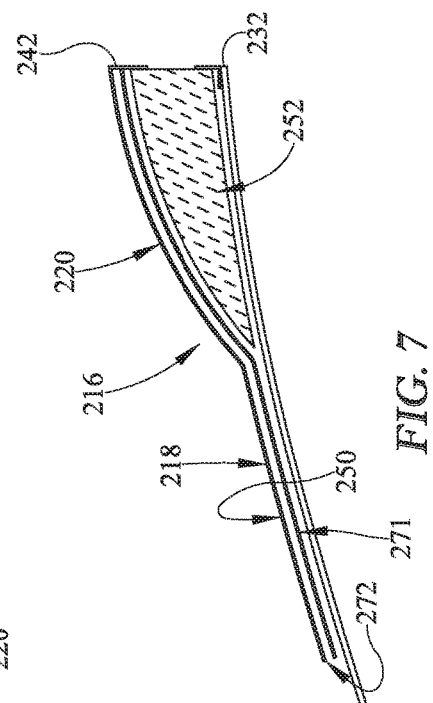
FIG. 5
FIG. 6
FIG. 7

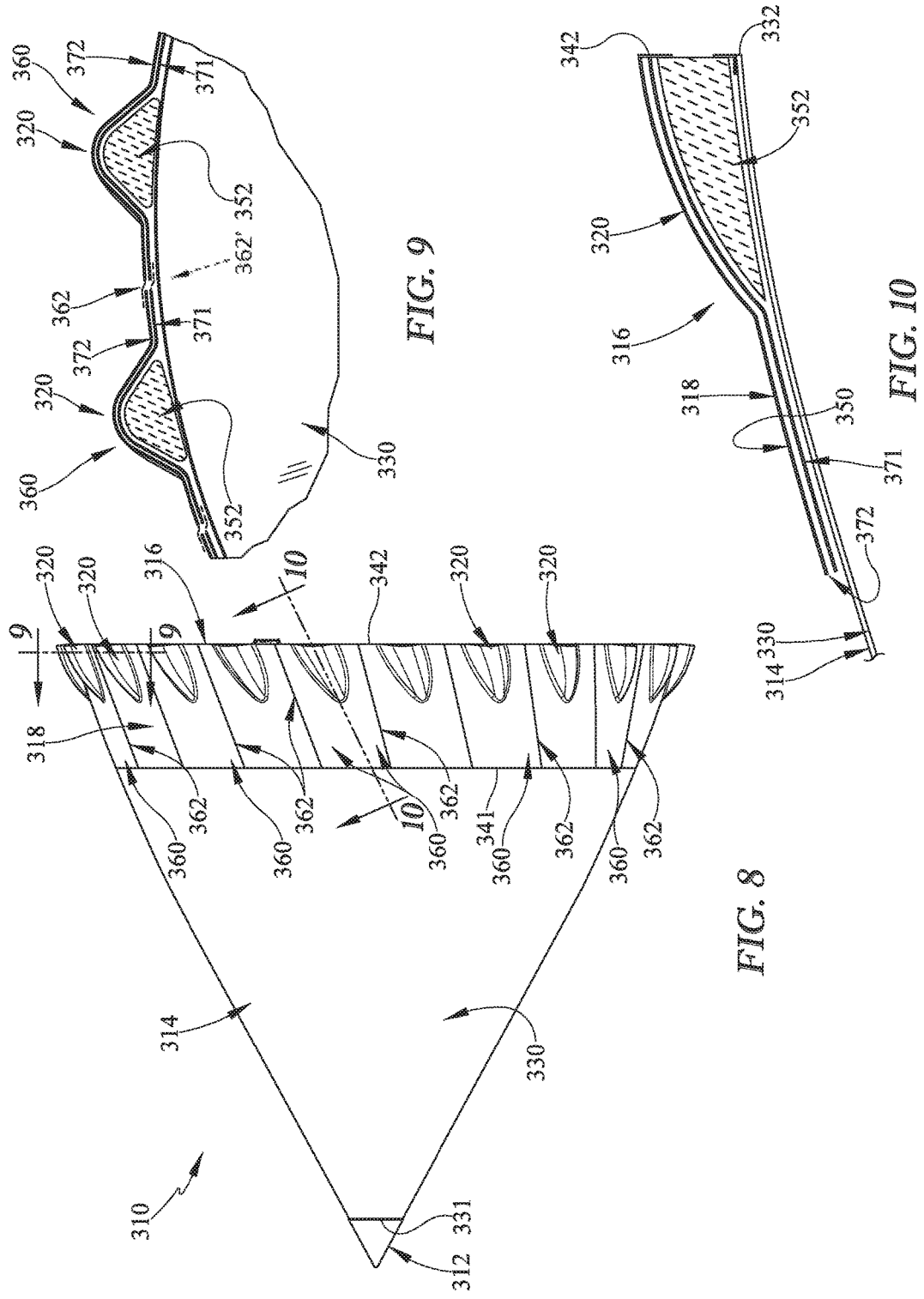

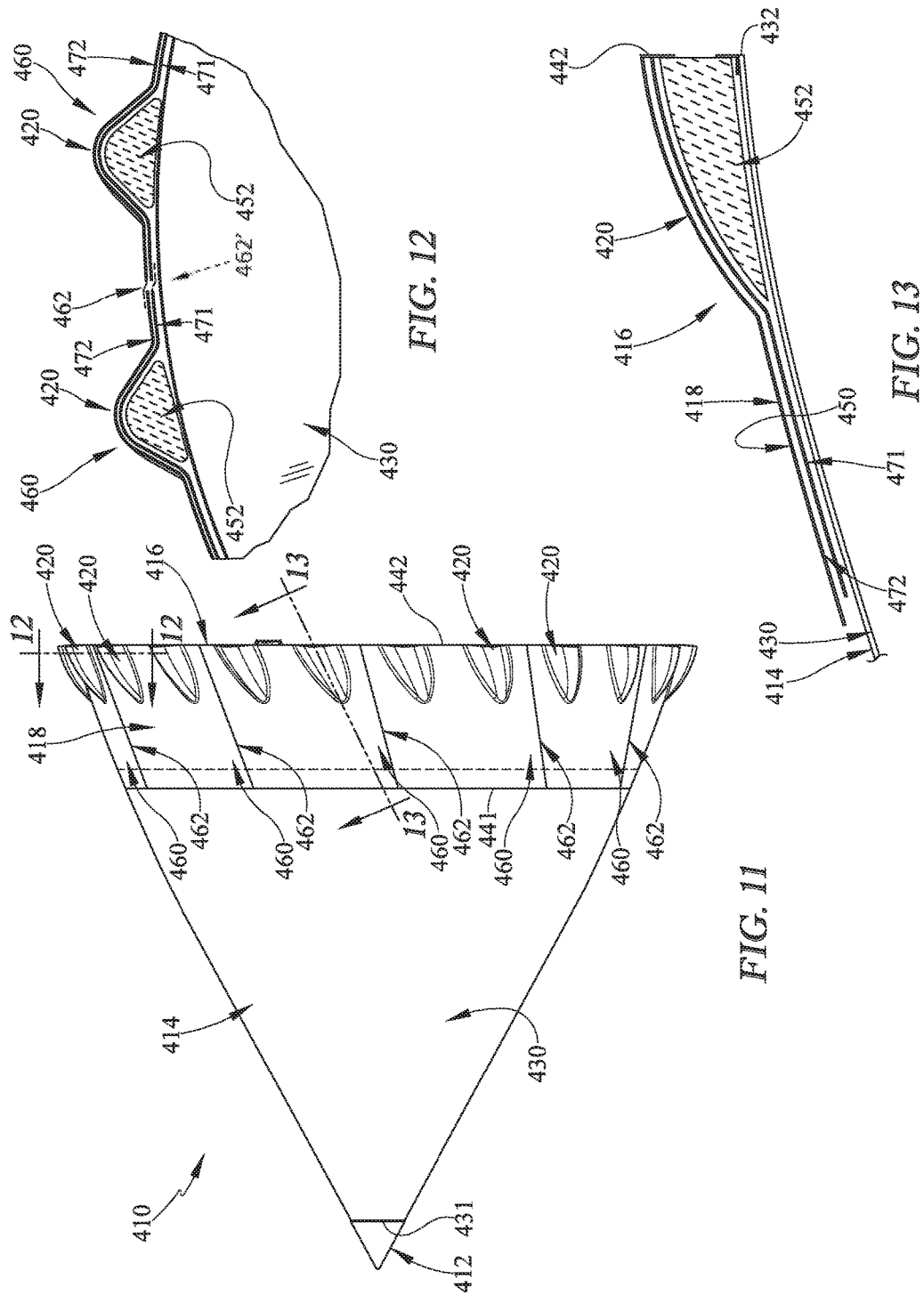

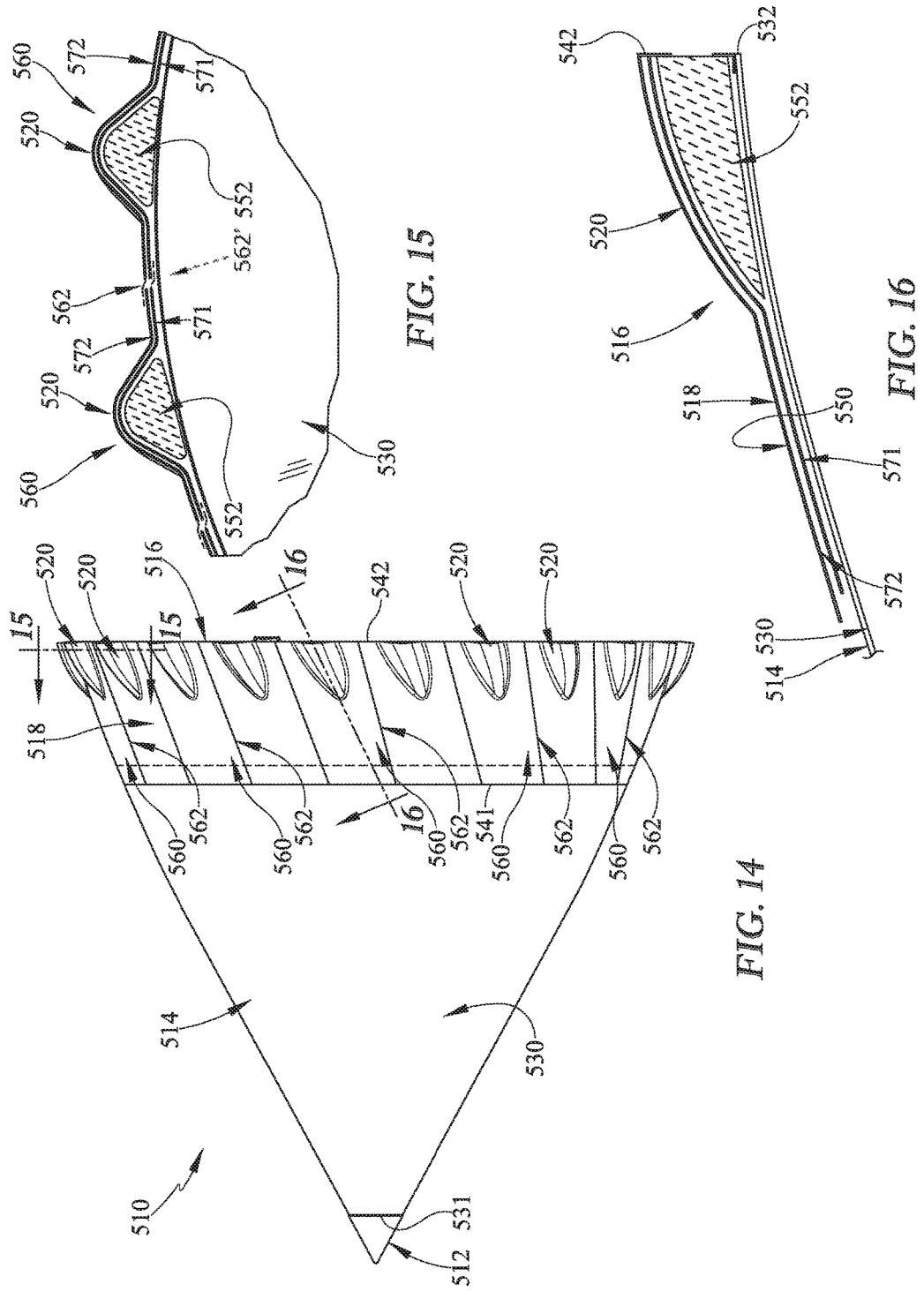

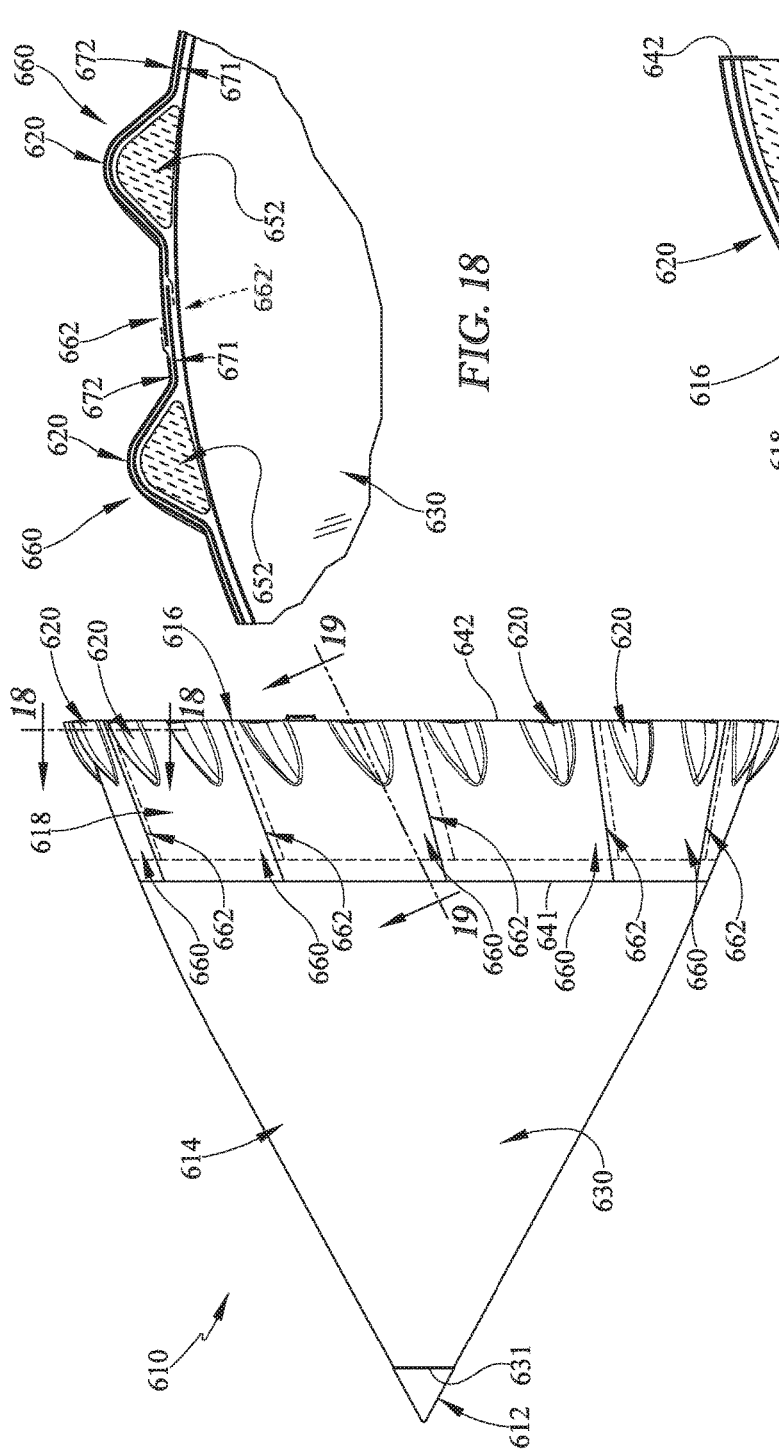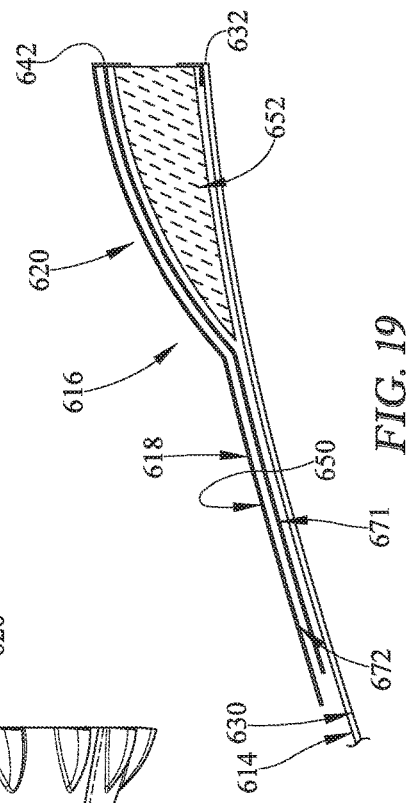

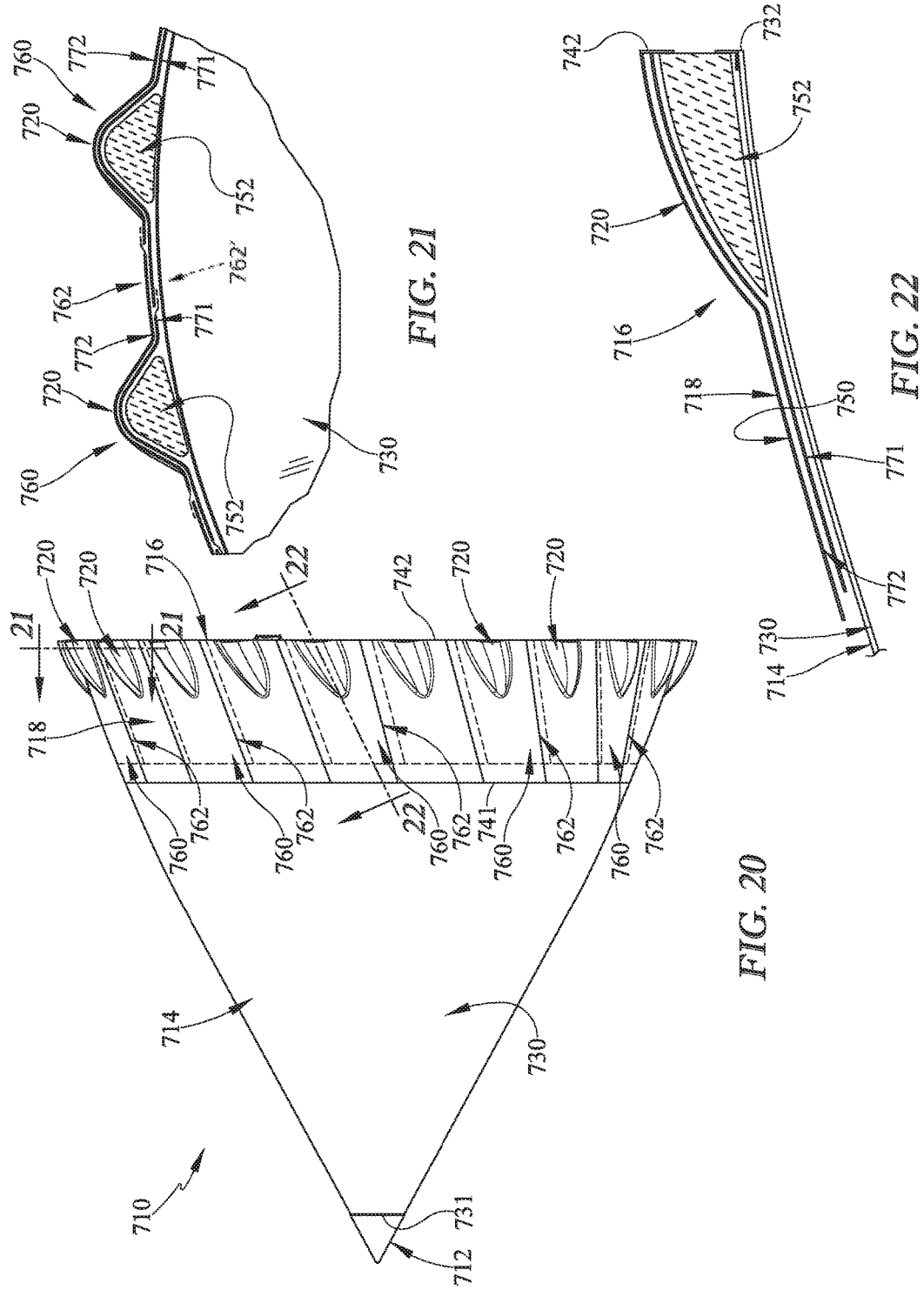

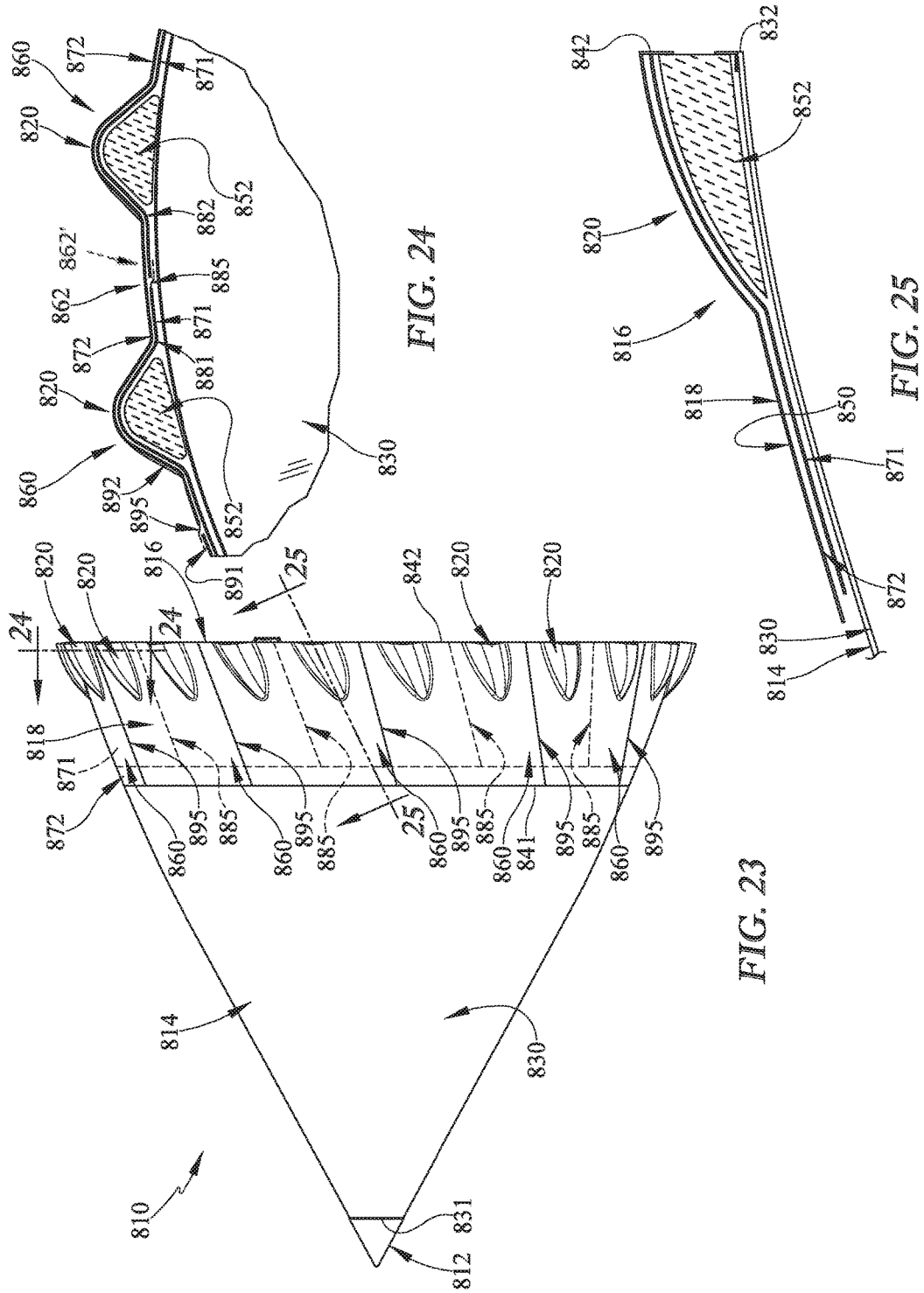

SPINNER FOR A GAS TURBINE ENGINE

This application claims priority to and the benefit of U.S. Provisional Patent Application No. 61/947,084 filed 3 Mar. 2014, the disclosure of which is now expressly incorporated herein by reference.

FIELD OF THE DISCLOSURE

The present disclosure relates generally to fan assemblies used in gas turbine engines, and more specifically to a spinner or nose cone adapted for use in such fan assemblies.

BACKGROUND

Gas turbine engines used to power aircraft often include a relatively-large diameter fan assembly that is driven by an engine core. The fan assembly blows air to provide thrust for moving the aircraft. Such fans typically include a bladed wheel mounted to the engine core to be rotated by the engine core and a spinner mounted to the bladed wheel to rotate with the bladed wheel. The spinner is designed to direct air radially-outward from the center of the bladed wheel and into blades of the fan assembly so that the blades can accelerate the air.

Some spinners include components made from composite materials in order to reduce the weight of a corresponding fan assembly. Manufacturing of spinners made from composite materials can present challenges when specific aerodynamic geometries are desired. In particular, spinners with asymmetric aerodynamic geometries can be difficult to manufacture while maintaining strength required for use in a fan assembly.

SUMMARY

The present disclosure may comprise one or more of the following features and combinations thereof.

According to a first aspect of the present disclosure, a spinner for use in a gas turbine engine may include filament-wound body and an aft ring. The body may be substantially symmetrical around a central axis. The body may include a side wall having a diameter that increases along the central axis from a forward side of the body to an aft side of the body. The aft ring may include a band that overlaps a portion of the side wall along the aft side of the body and a plurality of fairings that extend outward in a radial direction from the band away from the central axis.

In some embodiments, the aft ring may be formed from a composite material. The aft ring may be bonded to the body by a resin.

In some embodiments, the aft ring may include a continuous braided sock of woven fabric that extends around the aft side of the body without an axial seam that extends along the central axis. The fairings included in aft ring may be formed by prearranged portions of the continuous braided sock filled with a plug.

In some embodiments, the aft ring may include a plurality of segments each arranged to extend around a portion of the diameter of the aft ring. Each segment may be formed to include a first fairing and a second fairing. Each segment may be formed to include only one fairing.

In some embodiments, each segment may include a plurality of layers. At least one radially-outer layer may extend further in the axial direction along the body toward the forward side of the body than at least one radially-inner layer.

In some embodiments, each segment may be spaced circumferentially apart from adjacent segments. Abutment joints may be formed between each pair of adjacent segments.

In some embodiments, each segment is arranged to circumferentially overlap a portion of one adjacent segment to form circumferentially overlapping joints between each pair of adjacent segments. Each segment may include a plurality of layers in which at least one radially-interior layer extends circumferentially under a radially-outer layer of an adjacent segment and abuts a radially-inner layer of the adjacent segment.

According to another aspect of the present disclosure, a spinner for use in a gas turbine engine may include a body and an aft ring. The body may include a side wall having a diameter that increases along a central axis from a forward side of the body to an aft side of the body. The aft ring may overlap the side wall along the aft side of the body and may include a first layer of plies arranged circumferentially adjacent to one another to form circumferential joints between plies and a second layer of plies arranged circumferentially adjacent to one another to form circumferential joints between plies.

In some embodiments, the circumferential joints of the first layer of plies may be circumferentially offset from the circumferential joints of the second layer of plies by at least one fairing. The at least one fairing may extend outward in a radial direction away from the central axis.

In some embodiments, the second layer of plies may be radially-adjacent to the first layer of plies. Accordingly, the aft ring may be free of plies sandwiched between the first layer of plies and the second layer of plies.

In some embodiments, the plies of the first layer of plies may be made from woven fabric. The second layer of plies may be made from woven fabric.

In some embodiments, at least one fairing may be formed by a plug arranged radially between the side wall and the first layer of plies. The plug may be arranged radially between the side wall and the second layer of plies. The plug may include reinforcing fibers suspended in a matrix material.

According to another aspect of the present disclosure, a fan assembly may include a bladed wheel including a hub and a plurality of fan blades coupled to the hub to extend radially outward from the hub, and a spinner coupled to the hub. The spinner may include a filament-wound body having a side wall arranged around a central axis and an aft ring made from composite materials bonded to the side wall of the body.

In some embodiments, the aft ring may include a band and a plurality of fairings. The band may overlap the side wall adjacent to the hub. The plurality of fairings may extend outward in a radial direction from the band away from the central axis ahead of each fan blade included in the bladed wheel.

In some embodiments, the aft ring may be formed from a plurality of segments. Each of the segments may be arranged to extend around a portion of the diameter of the aft ring.

In some embodiments, each segment may be arranged to circumferentially overlap a portion of one adjacent segment. Accordingly, the segments may form circumferentially overlapping joints between each pair of adjacent segments.

These and other features of the present disclosure will become more apparent from the following description of the illustrative embodiments.

BRIEF DESCRIPTION OF THE DRAWINGS

FIG. 2 is a perspective view of a first illustrative spinner adapted for use in the fan assembly of a gas turbine engine showing that the spinner includes a forward tip, a generally frustoconical body, and an aft ring formed to include a band and a number of fairings that extend outwardly from the band;

FIG. 3 is a partial cross-sectional view of the spinner of FIG. 2 taken along line 3-3 showing that the aft ring is formed from a fabric layer arranged to extend a similar axial distance over the body;

FIG. 5 is a perspective view of a second illustrative spinner showing that the spinner includes a forward tip, a generally frustoconical body, and a segmented aft ring having a number of segments each forming two fairings;

FIG. 6 is a partial aft elevation view of the spinner shown in FIG. 5 showing that the aft ring is formed from segments arranged to form circumferentially abutting joints;

FIG. 7 is a partial cross-sectional view of the spinner of FIG. 6 taken along line 7-7 showing that the aft ring is formed from a plurality of fabric layers arranged to extend a similar axial distance over the body;

FIG. 8 is a perspective view of a third illustrative spinner showing that the spinner includes a forward tip, a generally frustoconical body, and a segmented aft ring having a number of segments each forming one fairing;

FIG. 9 is a partial aft elevation view of the spinner shown in FIG. 8 showing that the aft ring is formed from segments arranged to form circumferentially abutting joints;

FIG. 10 is a partial cross-sectional view of the spinner of FIG. 8 taken along line 10-10 showing that the aft ring is formed from a plurality of fabric layers arranged to extend a similar axial distance over the body;

FIG. 11 is a perspective view of a fourth illustrative spinner showing that the spinner includes a forward tip, a generally frustoconical body, and a segmented aft ring having a number of segments each forming two fairings;

FIG. 12 is a partial aft elevation view of the spinner shown in FIG. 11 showing that the aft ring is formed from segments arranged to form circumferentially abutting joints;

FIG. 13 is a partial cross-sectional view of the spinner of FIG. 11 taken along line 13-13 showing that the aft ring is formed from a plurality of fabric layers staggered so that the thickness of the aft ring increases as the aft ring extends axially aft over the body;

FIG. 14 is a perspective view of a fifth illustrative spinner showing that the spinner includes a forward tip, a generally frustoconical body, and a segmented aft ring having a number of segments each forming one fairing;

FIG. 15 is a partial aft elevation view of the spinner shown in FIG. 14 showing that the aft ring is formed from segments arranged to form circumferentially abutting joints;

FIG. 16 is a partial cross-sectional view of the spinner of FIG. 14 taken along line 16-16 showing that the aft ring is formed from a plurality of fabric layers staggered so that the thickness of the aft ring increases as the aft ring extends axially aft over the body;

FIG. 17 is a perspective view of a sixth illustrative spinner showing that the spinner includes a forward tip, a generally frustoconical body, and a segmented aft ring having a number of segments each forming two fairings;

FIG. 18 is a partial aft elevation view of the spinner shown in FIG. 17 showing that the aft ring is formed from segments made from a plurality of fabric layers arranged to form circumferentially overlapping joints;

FIG. 19 is a partial cross-sectional view of the spinner of FIG. 17 taken along line 19-19 showing that the aft ring is formed from a plurality of fabric layers staggered so that the thickness of the aft ring increases as the aft ring extends axially aft over the body;

FIG. 20 is a perspective view of a seventh illustrative spinner showing that the spinner includes a forward tip, a generally frustoconical body, and a segmented aft ring having a number of segments each forming one fairing;

FIG. 21 is a partial aft elevation view of the spinner shown in FIG. 20 showing that the aft ring is formed from segments made from a plurality of fabric layers arranged to form circumferentially overlapping joints;

FIG. 22 is a partial cross-sectional view of the spinner of FIG. 20 taken along line 22-22 showing that the aft ring is formed from a plurality of fabric layers staggered so that the thickness of the aft ring increases as the aft ring extends axially aft over the body;

FIG. 23 is a perspective view of an eighth illustrative spinner showing that the spinner includes a forward tip, a generally frustoconical body, and an aft ring forming a number of fairings;

FIG. 24 is a partial aft elevation view of the spinner shown in FIG. 23 showing that the aft ring is formed from layers of fabric plies arranged to form circumferentially spaced apart joints; and FIG. 25 is a partial cross-sectional view of the spinner of FIG. 23 taken along line 25-25 showing that the plurality of fabric plies are staggered so that the thickness of the aft ring increases as the aft ring extends axially aft over the body.

DETAILED DESCRIPTION OF THE DRAWINGS

Figure 1:
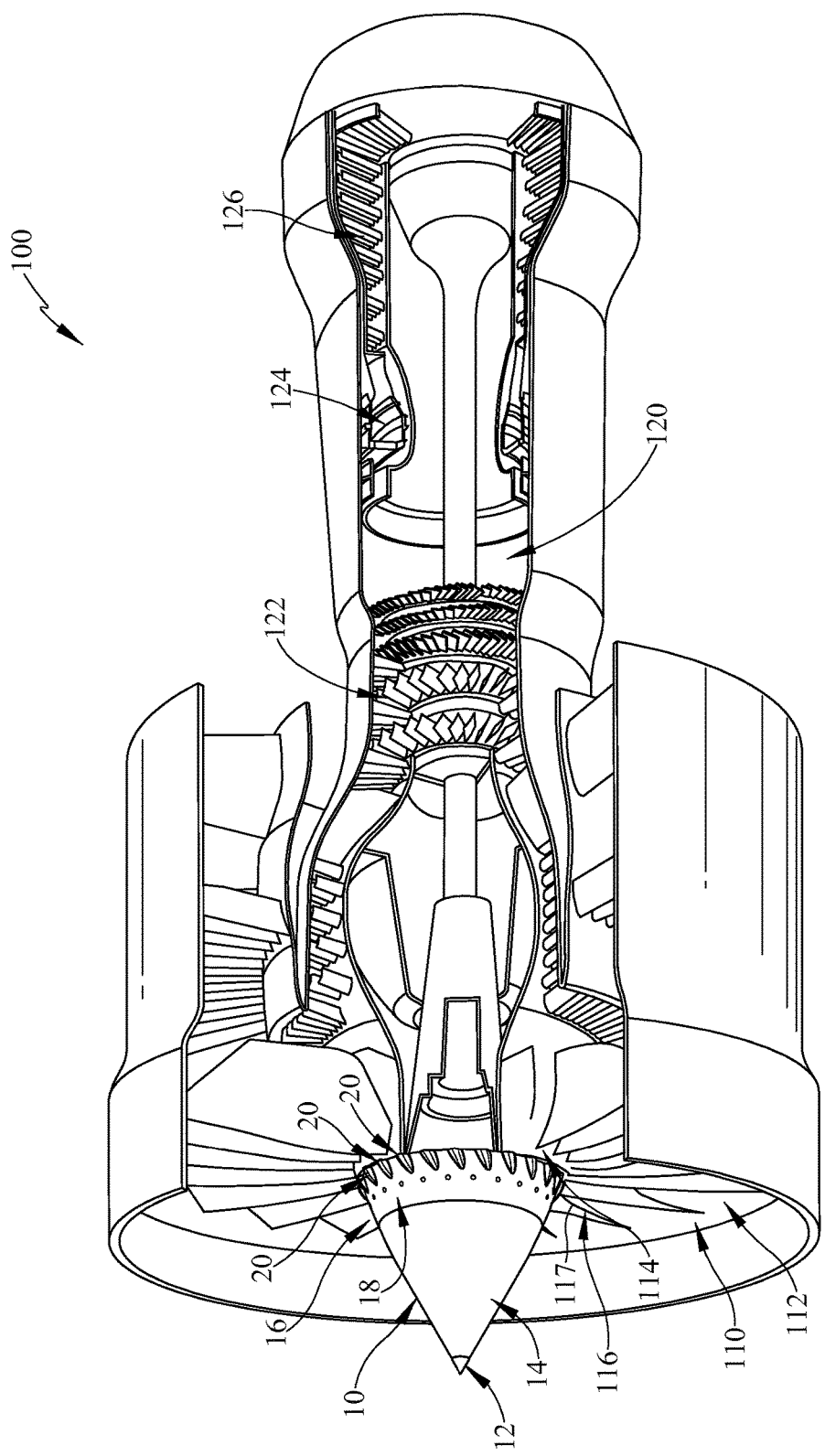
FIG. 1 is a perspective view of a gas turbine engine showing that a fan assembly of the engine that includes a hub, fan blades coupled to the hub, and a spinner coupled to the hub and showing that the engine further includes a compressor, combustor, and turbine that cooperate to drive rotation of the fan assembly.

For the purposes of promoting an understanding of the principles of the disclosure, reference will now be made to a number of illustrative embodiments illustrated in the drawings and specific language will be used to describe the same.

An illustrative aerospace gas turbine engine 100 includes a fan assembly 110 adapted to accelerate/blow air so that the air provides thrust for moving an aircraft as shown in FIG. 1. The illustrative fan assembly 110 includes a bladed wheel 112 and a spinner 10 mounted to the bladed wheel 112 to rotate with the bladed wheel 112. The spinner 10 directs air radially-outward from a hub 114 included in the bladed wheel 112 toward fan blades 116 included in the bladed wheel 112 so that the fan blades 116 can accelerate/blow the air.

The spinner 10 (sometimes called a nose cone) illustratively includes a forward tip 12, a body 14, and an aft ring 16 as shown in FIG. 1. The aft ring 16 is formed to include a band 18 and a number of fairings 20 that extend outwardly from the band 18. In the illustrative embodiment, each fairing 20 is arranged in front of a corresponding fan blade 116 to improve performance of the gas turbine engine 100 by redirecting air around a blunt leading edge 117 of the fan blade 116.

In the illustrative embodiment, at least some components of the spinner 10 are made from composite materials. Particularly, the illustrative body 14 includes filaments wound around a central axis 11 by a filament winding process to produce a symmetric component that is then cured to set the shape of the component. It is contemplated that, in some embodiments, the body 14 may be made from braided or unidirectional tape materials suspended in a matrix to form a generally-symmetric composite component without an axially-extending seam. The illustrative aft ring 16 includes woven fabric plies and plugs that are cured (or preformed) in a matrix material to form an asymmetric shape including the fairings 20 arranged around the central axis 11. The aft ring 16 is bonded to the body 14 using a mold tool and a resin transfer molding process (RTM) so that the body 14 and the aft ring 16 form an integral (unitary) nosecone component 15 that is strong enough for use in the fan assembly 110.

The fan assembly 110 is illustratively mounted to a turbine engine core 120 to be rotated by the engine core 120 as shown, for example, in FIG. 1. The engine core 120 includes a compressor 122, a combustor 124, and a turbine 126. The compressor 122 is configured to compress and deliver air to the combustor 124. The combustor 124 is configured to mix fuel with the compressed air received from the compressor 122 and to ignite the fuel. The hot high pressure products of the combustion reaction in the combustor 124 are directed into the turbine 126 and the turbine 126 extracts work to drive the compressor 122 and the fan assembly 110.

In the illustrative embodiment, the forward tip 12 is mounted to the body 14 and is a monolithic component made from an elastomeric material. The forward tip 12 is adapted to flex. In other embodiments, the forward tip 12 may be formed from a composite material or another material.

Figure 4:
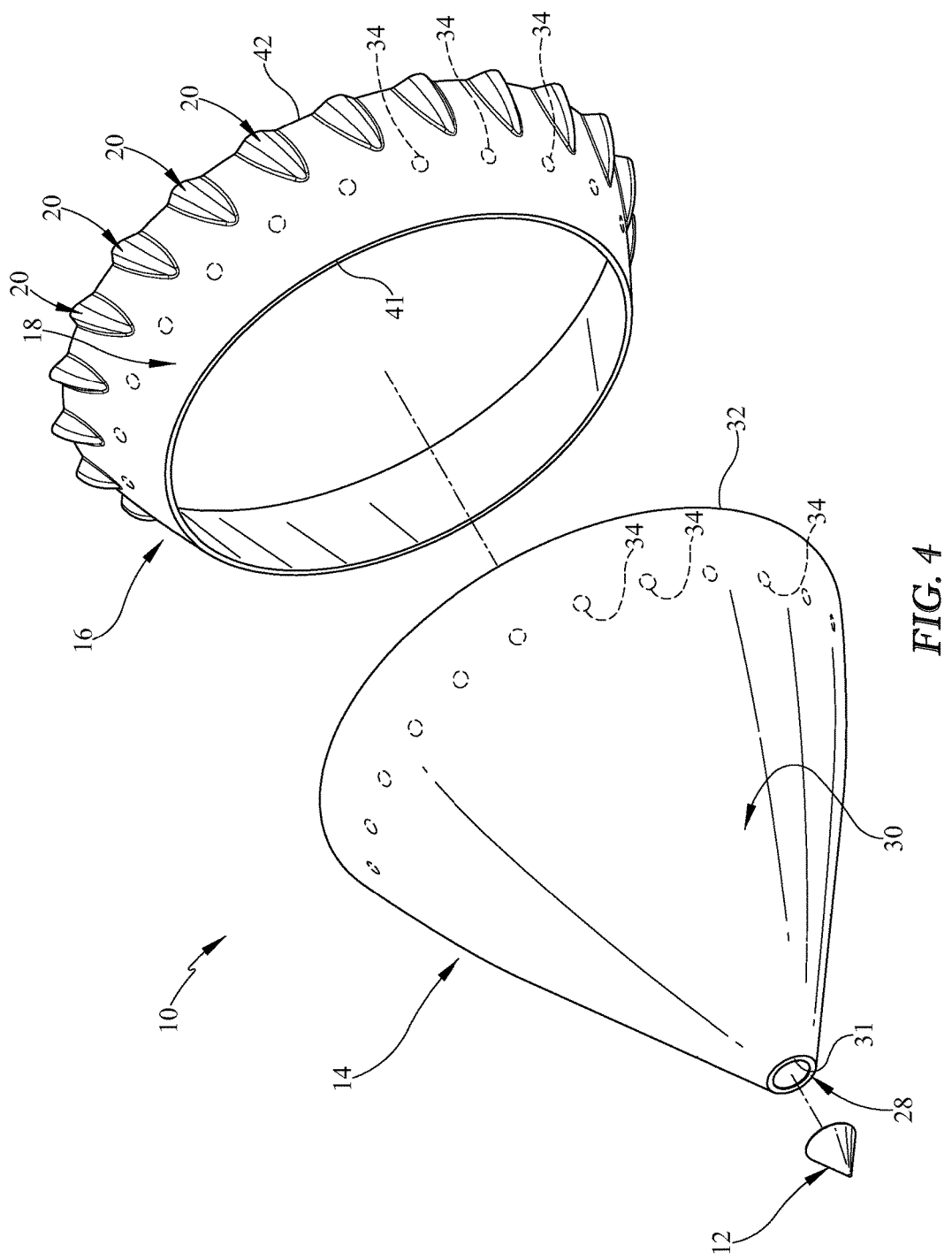
FIG. 4 is an exploded perspective view of the spinner shown in FIG. 2 to expose details of the forward tip, the body, and the aft ring showing that the aft ring is formed as a full hoop without circumferential seams.

The body 14 is illustratively hollow and has a generally frustoconical shape as shown in FIG. 4. The body 14 includes a front wall 28 arranged at a front side 31 of the body 14 and a side wall 30 that extends aft from the front wall 28 to an aft side 32 of the body 14. The front wall 28 is engaged by the forward tip 12 and forms an aperture 31 that receives a portion of the forward tip 12 that extends into the body 14. The side wall 30 has a diameter that increases along the central axis 11 from the forward side 31 of the body 14 to the aft side 32 of the body 14.

In the illustrative embodiment, the side wall 30 is arcuate along a curve as it extends from the forward side 31 of the body 14 to the aft side 32 of the body 14. In other embodiments, the side wall 30 may extend along a straight line as it extends from the forward side 31 of the body 14 to the aft side 32 of the body 14 so that the body 14 is substantially frustoconical in shape.

The aft ring 16 illustratively includes the band 18 and the fairings 20 as shown in FIGS. 2 and 4. The band 18 overlaps a portion of the side wall 30 along the aft side 32 of the body 14. The fairings 20 extend outward in a radial direction from the band 18 away from the central axis 11. The fairings 20 are arranged to extend from an aft side 42 of the aft ring 16 toward a front side 41 of the aft ring 16 and some circumferential distance around the aft ring 16. The fairings 20 are also spaced equidistantly from one another around the circumference of the band 18.

In some embodiments, the side wall 30 of the body 14 and/or the band 18 of the aft ring 16 may be formed to include a number of holes 34 for attaching the spinner 10 to the bladed wheel 112 of the fan assembly 110 by way of other components in a nose cone assembly (not shown). For example, the spinner 10 may be included in a nose cone assembly similar to that shown in U.S. Published Application No. 2012/0134843A1 or shown in U.K. Published Patent Application No. GB2363170A1 which are both hereby incorporated by reference herein in their entirety. In other examples, other means of attaching the spinner 10 to the bladed wheel 112 may be used.

In the first illustrative spinner 10 shown in FIGS. 1-4, the aft ring 16 includes a continuous braided sock of woven fabric 50 and a plurality of plugs 52 arranged along the circumference of the continuous braided sock of woven fabric 50 to form the fairings 20 as shown in FIGS. 3 and 4. The continuous braided sock of woven fabric 50 extends around the aft side 32 of the body 14 without an axial seam that extends along the central axis 11. The plugs 52 fill the fairings 20 and are bonded to or preformed with the continuous braided sock of woven fabric 50 prior to bonding of the aft ring 16 to the body 14.

The continuous braided sock of woven fabric 50 is bonded to the body 14 during the resin transfer molding process. In the illustrative embodiment, the continuous braided sock of woven fabric 50 is arranged to provide the outer surface of the spinner 10 along the aft ring 16 portion of the spinner 10. In other embodiments, the continuous braided sock of woven fabric 50 may be replaced by or reinforced with uni-directional tape or woven fabric segments with one or more axial seams that extends along the central axis 11.

The plugs 52 are illustratively made from a bulk molding compound that may have reinforcing fibers suspended in a matrix material (e.g. LYTEX®). In other embodiments, the plugs 52 may be made from epoxy filler, machined plastics, or another suitable material. The plugs 52 may also include or be made from filler plies local to the fairing region that reinforce the fairing region and the aft ring 16.

Filament winding of composite materials was selected as one manufacturing process for the body 14 of the illustrative spinner 10 for cost and weight reasons. Filament winding is largely constrained to the production of components that are symmetrical about a centerline. In the illustrative embodiment, the aerodynamic fairings 20 in front of fan blades 116 are mounted to the filament wound body 14 to improve performance by redirecting air around the blunt leading edge 117 of the blades 116. Redirection of air around blades 116 is sometimes desirable for high-performing fans 100 where the fan hub 114 radius has been minimized. The illustrative spinner 10 integrates the separate materials used to create the body 14 and the fairings 20 to improve robustness and minimize in-service repair burdens and improve performance.

The illustrative spinner 10 includes a symmetrical filament wound cone 14 with asymmetrical woven fabric 50 to create the final spinner geometry in an aerodynamically efficient shape. The primary structure is the filament wound cone 14. The outer surface (air washed surface) at aft edge of the spinner 10 is comprised of composite woven fabric 50. That fabric could be carbon, glass, or a combination of the two. Alternatively, uni-directional tape could be used. A separate material 52 is used to fill in the interior of the bump shapes 20. These elements 14, 50, 52 are assembled into mold tooling and RTM (Resin Transfer Mold) processed and cured together to form one integral component as suggested in FIG. 2.

By combining woven fabric 50 with the filament winding, geometry that is not symmetrical about an axis can be achieved while still having the structural features of a filament wound cone 14. As the different materials are RTM processed and cured together, the bump shapes 20 are integral to the cone 10. This provides a design that is robust against material loss during service. Additionally, weight and cost are reduced with having one generally seamless component rather than two or more separate parts.

Another illustrative spinner 210 adapted for use in gas turbine engine 100 is shown in FIGS. 5-7. The spinner 210 is substantially similar to the spinner 10 shown in FIGS. 1-4 and described herein. Accordingly, similar reference numbers in the 200 series indicate features that are common between the spinner 10 and the spinner 210. Specifically (but not exclusively), the forward tip 212 and the body 214 included in the spinner 210 are equivalent to the forward tip 12 and the body 14 of the spinner 10. The description of the spinner 10 is hereby incorporated by reference to apply to the spinner 210, except in instances when it conflicts with the specific description and drawings of the spinner 210.

Like the spinner 10, an aft ring 216 of the spinner 210 illustratively includes a band 218 and fairings 220 as shown in FIG. 5. The band 218 overlaps the side wall 230 included in the body 214 along the aft side 232 of the body 214. The fairings 220 extend outward in a radial direction from the band 218 away from the central axis 211. The fairings 220 are arranged to extend from an aft side 242 of the aft ring 216 toward a front side 241 of the aft ring 216 and some circumferential distance around the aft ring 216. The fairings 220 are also spaced equidistantly from one another around the circumference of the band 218.

Unlike the spinner 10, the spinner 210 includes an aft ring 216 that includes a plurality of segments 260 as shown in FIGS. 5-7. The plurality of segments 260 are coupled to one another by axially-extending and circumferentially-extending joints 262 as shown in FIG. 5. The segments 260 are bonded to or preformed together prior to bonding of the aft ring 216 to the body 214.

In the illustrative embodiment, the joints 262 are abutment joints formed by the segments 260 as shown in FIGS. 5 and 7. For purposes of this disclosure, abutment joints are joints formed by circumferentially adjacent placement of the segments 260 next to one another without overlapping. Optionally, the abutment joint 262 may be a lap joint 262' having some overlap as suggested in phantom in FIG. 6.

Each segment 260 illustratively includes one or more layers of dry woven fabric sheets 271, 272 and a pair of plugs 252 forming two fairings 220 as shown in FIGS. 5-7. The dry woven fabric sheets 271, 272 illustratively extend substantially the same distance in the axial direction along side wall 230 of the body 214 toward the forward side 231 of the side wall 230 as shown in FIG. 7. The plugs 252 fill the fairings 220 formed by the aft ring 216 and are bonded to or preformed with the dry woven fabric sheets 271, 272 prior to bonding of the aft ring 216 to the body 214. In other embodiments, more plugs 252 may be included in each segment 260.

The dry woven fabric sheets 271, 272 are bonded to the body 214 during the resin transfer molding process. In the illustrative embodiment, the dry woven fabric sheets 271, 272 are arranged to provide the outer surface of the spinner 210 along the aft ring 216 portion of the spinner 210. In other embodiments, the dry woven fabric sheets 271, 272 may be replaced by or reinforced with uni-directional tape.

In the illustrative spinner 210, the bump ring 216 is comprised of one or more layers of dry woven fabric segments 260 that contain a binder. Each of these segments 260 spans two or more bumps. The binder is added to the dry fabric so that the bumps may be pre-formed into a "preform" to retain their shape prior to and during the RTM process. Alternatively, a dry fabric could be used where a resin is applied to the fabric during the assembly of the bump ring 216 prior to RTM. Another alternative is to use fabric pre-impregnated with resin. Where the segments 260 meet there is illustratively an abutment joint 262 (no overlap in the segments). Optionally, the abutment joint 262 may be a lap joint 262' having some overlap as suggested in phantom in FIG. 6.

Another illustrative spinner 310 adapted for use in gas turbine engine 100 is shown in FIGS. 8-10. The spinner 310 is substantially similar to the spinner 210 shown in FIGS. 5-7 and described herein. Accordingly, similar reference numbers in the 300 series indicate features that are common between the spinner 210 and the spinner 310. The description of the spinner 210 is hereby incorporated by reference to apply to the spinner 310, except in instances when it conflicts with the specific description and drawings of the spinner 310.

Unlike the spinner 210, each segment 360 included in the aft ring 316 of spinner 310 forms only one fairing 320 of the aft ring 316 as shown in FIG. 8. More particularly, each segment 360 included in the aft ring 316 includes one or more layers of dry woven fabric sheets 371, 372 and a single plug 352 forming a single fairing 320 as shown in FIGS. 8 and 10.

Another illustrative spinner 410 adapted for use in gas turbine engine 100 is shown in FIGS. 11-13. The spinner 410 is substantially similar to the spinner 10 shown in FIGS. 1-4 and described herein. Accordingly, similar reference numbers in the 400 series indicate features that are common between the spinner 10 and the spinner 410. Specifically (but not exclusively), the forward tip 412 and the body 414 included in the spinner 410 are equivalent to the forward tip 12 and the body 14 of the spinner 10. The description of the spinner 10 is hereby incorporated by reference to apply to the spinner 410, except in instances when it conflicts with the specific description and drawings of the spinner 410.

Like the spinner 10, an aft ring 416 of the spinner 410 illustratively includes a band 418 and fairings 420 as shown in FIG. 11. The band 418 overlaps the side wall 430 included in the body 414 along the aft side 432 of the body 414. The fairings 420 extend outward in a radial direction from the band 418 away from the central axis 411. The fairings 420 are arranged to extend from an aft side 442 of the aft ring 416 toward a front side 441 of the aft ring 416 and some circumferential distance around the aft ring 416. The fairings 420 are also spaced equidistantly from one another around the circumference of the band 418.

Unlike the spinner 10, the spinner 410 includes an aft ring 416 that includes a plurality of segments 460 as shown in FIGS. 11-13. The plurality of segments 460 are coupled to one another by axially-extending and circumferentially-extending joints 462 as shown in FIG. 11. The segments 460 are bonded to or preformed together prior to bonding of the aft ring 416 to the body 414.

In the illustrative embodiment, the joints 462 are abutment joints formed by the segments 460 as shown in FIG. 13. For purposes of this disclosure, abutment joints are joints formed by circumferentially adjacent placement of the segments 460 next to one another without overlapping. Optionally, the abutment joint 462 may be a lap joint 462' having some overlap as suggested in phantom in FIG. 12.

Each segment 460 illustratively includes one or more layers of dry woven fabric sheets 471, 472 and a pair of plugs 452 as shown in FIGS. 11 and 13. The dry woven fabric sheets 471, 472 are arranged to be stepped up to gradually increase the thickness of the band 418 of the aft ring 16 as the band 418 extends from a forward side 441 of the aft ring 416 toward an aft side 442 of the aft ring 416 as shown in FIG. 13. The plugs 452 fill the fairings 420 formed by the aft ring 416 and are bonded to or preformed with the dry woven fabric sheets 471, 472 prior to bonding of the aft ring 416 to the body 414. In other embodiments, more plugs 452 may be included in each segment 460.

In the illustrative embodiment, radially-outer layer 472 of the aft ring 416 extends further in the axial direction along the side wall 430 toward the forward side 431 of the side wall 430 than radially-inner layer 471. This arrangement may reduce the resin infused along the forward side 441 of the aft ring 416.

The dry woven fabric sheets 471, 472 are bonded to the body 414 during the resin transfer molding process. In the illustrative embodiment, the dry woven fabric sheets 471, 472 are arranged to provide the outer surface of the spinner 410 along the aft ring 416 portion of the spinner 410. In other embodiments, the dry woven fabric sheets 471, 472 may be replaced by or reinforced with uni-directional tape.

Another illustrative spinner 510 adapted for use in gas turbine engine 100 is shown in FIGS. 14-16. The spinner 510 is substantially similar to the spinner 410 shown in FIGS. 11-13 and described herein. Accordingly, similar reference numbers in the 500 series indicate features that are common between the spinner 410 and the spinner 510. The description of the spinner 410 is hereby incorporated by reference to apply to the spinner 510, except in instances when it conflicts with the specific description and drawings of the spinner 510.

Unlike the spinner 410, each segment 560 included in the aft ring 516 of spinner 510 forms only one fairing 520 of the aft ring 516 as shown in FIG. 14. More particularly, each segment 560 included in the aft ring 516 includes one or more layers of dry woven fabric sheets 571, 572 and a single plug 552 forming a single fairing 520 as shown in FIGS. 14 and 16.

Another illustrative spinner 610 adapted for use in gas turbine engine 100 is shown in FIGS. 17-19. The spinner 610 is substantially similar to the spinner 10 shown in FIGS. 1-4 and described herein. Accordingly, similar reference numbers in the 600 series indicate features that are common between the spinner 10 and the spinner 610. Specifically (but not exclusively), the forward tip 612 and the body 614 included in the spinner 610 are equivalent to the forward tip 12 and the body 14 of the spinner 10. The description of the spinner 10 is hereby incorporated by reference to apply to the spinner 610, except in instances when it conflicts with the specific description and drawings of the spinner 610.

Like the spinner 10, an aft ring 616 of the spinner 610 illustratively includes a band 618 and fairings 620 as shown in FIG. 17. The band 618 overlaps the side wall 630 included in the body 614 along the aft side 632 of the body 614. The fairings 620 extend outward in a radial direction from the band 618 away from the central axis 611. The fairings 620 are arranged to extend from an aft side 642 of the aft ring 616 toward a front side 641 of the aft ring 616 and some circumferential distance around the aft ring 616. The fairings 620 are also spaced equidistantly from one another around the circumference of the band 618.

Unlike the spinner 10, the spinner 610 includes an aft ring 616 that includes a plurality of segments 660 as shown in FIGS. 17-19. The plurality of segments 660 are coupled to one another by axially-extending and circumferentially-extending joints 662 as shown in FIG. 17. The segments 660 are bonded to or preformed together prior to bonding of the aft ring 616 to the body 614.

Each segment 660 illustratively includes one or more layers of dry woven fabric sheets 671, 672 and a pair of plugs 652 as shown in FIGS. 17 and 19. The dry woven fabric sheets 671, 672 are arranged to be stepped up to gradually increase the thickness of the band 618 of the aft ring 16 as the band 618 extends from a forward side 641 of the aft ring 616 toward an aft side 642 of the aft ring 616 as shown in FIG. 19. The plugs 652 fill the fairings 620 formed by the aft ring 616 and are bonded to or preformed with the dry woven fabric sheets 671, 672 prior to bonding of the aft ring 616 to the body 614. In other embodiments, more plugs 652 may be included in each segment 660.

In the illustrative embodiment, radially-outer layer 672 of the aft ring 616 extends further in the axial direction along the side wall 30 toward the forward side 631 of the side wall 630 than radially-inner layer 671. This arrangement may reduce the resin infused along the forward side 641 of the aft ring 616.

In the illustrative embodiment, the joints 662 are staggered joints formed by the segments 660 as shown in FIG. 18. For purposes of this disclosure, staggered joints are joints formed when segments 660 are arranged to circumferentially overlap at least a portion of adjacent segments 660. In the illustrative embodiment, a radially-outer layer formed by a dry woven fabric sheet 672 included in each segment 660 is arranged to circumferentially overlap a radially-inner layer formed by a dry woven fabric sheet 671 of one adjacent segment 660 to form a staggered joint between each pair of adjacent segments 660. In the illustrative embodiment, radially-inner layers formed by dry woven fabric sheets 671 of adjacent segments 660 also extend circumferentially so that they abut one another as shown in FIG. 18. Optionally, the sheets within the same layer may form a lap joint 662' having some overlap as suggested in phantom in FIG. 18.

The dry woven fabric sheets 671, 672 are bonded to the body 614 during the resin transfer molding process. In the illustrative embodiment, the dry woven fabric sheets 671, 672 are arranged to provide the outer surface of the spinner 610 along the aft ring 616 portion of the spinner 610. In other embodiments, the dry woven fabric sheets 671, 672 may be replaced by or reinforced with uni-directional tape.

Another illustrative spinner 710 adapted for use in gas turbine engine 100 is shown in FIGS. 20-22. The spinner 710 is substantially similar to the spinner 610 shown in FIGS. 17-19 and described herein. Accordingly, similar reference numbers in the 700 series indicate features that are common between the spinner 610 and the spinner 710. The description of the spinner 610 is hereby incorporated by reference to apply to the spinner 710, except in instances when it conflicts with the specific description and drawings of the spinner 710.

Unlike the spinner 610, each segment 760 included in the aft ring 716 of spinner 710 forms only one fairing 720 of the aft ring 716 as shown in FIG. 20. More particularly, each segment 760 included in the aft ring 716 includes one or more layers of dry woven fabric sheets 771, 772 and a single plug 752 forming a single fairing 720 as shown in FIGS. 20 and 22.

Another illustrative spinner 810 adapted for use in gas turbine engine 100 is shown in FIGS. 23-25. The spinner 810 is substantially similar to the spinner 10 shown in FIGS. 1-4 and described herein. Accordingly, similar reference numbers in the 800 series indicate features that are common between the spinner 10 and the spinner 810. Specifically (but not exclusively), the forward tip 812 and the body 814 included in the spinner 810 are equivalent to the forward tip 12 and the body 14 of the spinner 10. The description of the spinner 10 is hereby incorporated by reference to apply to the spinner 810, except in instances when it conflicts with the specific description and drawings of the spinner 810.

Like the spinner 10, an aft ring 816 of the spinner 810 illustratively includes a band 818 and fairings 820 as shown in FIG. 23. The band 818 overlaps the side wall 830 included in the body 814 along the aft side 832 of the body 814. The fairings 820 extend outward in a radial direction from the band 818 away from the central axis 811. The fairings 820 are arranged to extend from an aft side 842 of the aft ring 816 toward a front side 841 of the aft ring 816 and some circumferential distance around the aft ring 816. The fairings 820 are also spaced equidistantly from one another around the circumference of the band 818.

Unlike the spinner 10, the spinner 810 includes an aft ring 816 that includes one or more layers of dry woven fabric sheets 871, 872 and plugs 852 that cooperate with the layers of sheets 871, 872 to form the fairings 820 as shown in FIGS. 23-25. The layers of dry woven fabric sheets 871, 872 form circumferentially offset joints 885, 895 between plies (or sheets) of material 881, 882, 891, 892.

In the particular embodiment shown, an inner layer of dry woven fabric sheets 871 includes plies (or individual sheets) 881, 882 that each extend part-way around the circumference of the body 814 and that form a joint 885 there between. An outer layer of dry woven fabric sheets 872 includes plies (or individual sheets) 891, 892 that each extend part-way around the circumference of the body 814 and that form a joint 895 therebetween. Each ply 881, 882, 891, 892 of the illustrative embodiment extends circumferentially far enough to form at least two fairings 820 and the joints 885, 895 are circumferentially offset from one another so that at least one fairing 820 is arranged between the joints 885, 895 of the radially-adjacent inner and outer layer of dry woven fabric sheets 871, 872. Optionally, the sheets within the same layer may form a lap joint 862' having some overlap as suggested in phantom in FIG. 24.

It is contemplated that a ply 881 of the inner layer of dry woven fabric sheets 871 may cooperate with a corresponding ply 891 of the outer layer of dry woven fabric sheets 872 to provide a segment 860 as suggested in FIG. 24. Such segment 860 are illustratively arranged to circumferentially overlap a portion of one adjacent segment 860 to form circumferentially overlapping joints 862 between each pair of circumferentially adjacent segments. Such segments 860 may extend over three or more plugs 852 and may contribute to the formation of three or more fairings 820. In some embodiments, additional layers of dry woven fabric sheets may be incorporated into the aft ring 816; such layers may include plies of material that form joints circumferentially offset from radially-adjacent layers by at least one fairing 820.

In the illustrative embodiment, a radially-outer layer 872 extends further in the axial direction along the body 814 toward the forward side 831 of the body 814 than a radially-inner layer 871. In other embodiments, the dry woven fabric sheets 871, 872 may extend substantially the same distance in the axial direction along side wall 830 of the body 814 toward the forward side 831 of the side wall 830 as suggested in the embodiment of FIG. 7. The plugs 852 fill the fairings 820 formed by the aft ring 816 and are bonded to or preformed with the dry woven fabric sheets 871, 872 prior to bonding of the aft ring 816 to the body 814 as suggested in FIG. 24.

The dry woven fabric sheets 871, 872 are bonded to the body 814 during the resin transfer molding process. In the illustrative embodiment, the dry woven fabric sheets 871, 872 are arranged to provide the outer surface of the spinner 810 along the aft ring 816 portion of the spinner 810. In other embodiments, the dry woven fabric sheets 871, 872 may be replaced by or reinforced with uni-directional tape.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A spinner for use in a gas turbine engine comprising
a unitary filament-wound body formed substantially symmetrically around a central axis, the body including a side wall that forms a majority of an exterior radially-outwardly facing surface of the spinner and that has a diameter that increases along the central axis from a forward side of the body to an aft side of the body, and
an aft ring including a band that overlaps a radially-outwardly facing portion of the side wall along the aft side of the body and a plurality of fairings that extend outward in a radial direction from the band away from the central axis,
wherein the aft ring includes a plurality of segments each arranged to extend around a portion of the diameter of the aft ring,
wherein each segment includes a plurality of layers in which at least one radially-outer layer extends further in the axial direction along the body toward the forward side of the body than at least one radially-inner layer.

2. The spinner of claim 1, wherein the aft ring is formed from a composite material and is bonded to the body by a resin.

3. The spinner of claim 1, wherein each segment is formed to include a first fairing and a second fairing.

4. The spinner of claim 1, wherein each segment is formed to include only one fairing.

5. The spinner of claim 1, wherein each segment is spaced circumferentially apart from adjacent segments to form abutment joints between each pair of adjacent segments.

6. A spinner for use in a gas turbine engine comprising
a unitary filament-wound body formed substantially symmetrically around a central axis, the body including a side wall that forms a majority of an exterior radially-outwardly facing surface of the spinner and that has a diameter that increases along the central axis from a forward side of the body to an aft side of the body, and
an aft ring including a band that overlaps a radially-outwardly facing portion of the side wall along the aft side of the body and a plurality of fairings that extend outward in a radial direction from the band away from the central axis,
wherein the aft ring includes a plurality of segments each arranged to extend around a portion of the diameter of the aft ring,
wherein each segment is arranged to circumferentially overlap a portion of one adjacent segment to form circumferentially overlapping joints between each pair of adjacent segments.

7. The spinner of claim 6, wherein each segment includes a plurality of layers in which at least one radially-outer layer extends further in the axial direction along the body toward the forward side of the body than at least one radially-inner layer.

8. The spinner of claim 6, wherein each segment includes a plurality of layers in which at least one radially-inner layer extends circumferentially under a radially-outer layer of an adjacent segment and abuts a radially-inner layer of the adjacent segment.

9. A spinner for use in a gas turbine engine comprising
a unitary body comprising composite materials, the body including a side wall that forms a majority of an exterior radially-outwardly facing surface of the spinner and that has a diameter that increases along a central axis from a forward side of the body to an aft side of the body, and
an asymmetric aft ring comprising composite materials that overlaps a radially-outwardly facing portion of the side wall along the aft side of the body, the aft ring including a first layer of woven-fabric plies and a second layer of woven-fabric plies arranged circumferentially around the first layer of woven-fabric plies, the first layer of woven-fabric plies arranged circumferentially adjacent to one another to form circumferential joints between plies, and the second layer of plies arranged circumferentially adjacent to one another to form circumferential joints between plies,
wherein the circumferential joints of the first layer of plies are circumferentially offset from the circumferential joints of the second layer of plies by at least one fairing that extends outward in a radial direction away from the central axis.

10. The spinner of claim 9, wherein the second layer of plies is radially-adjacent to the first layer of plies so that the aft ring is free of plies sandwiched between the first layer of plies and the second layer of plies.

11. The spinner of claim 9, wherein the at least one fairing is formed by a plug arranged radially between the side wall and the first layer of plies.

12. The spinner of claim 11, wherein the plug is arranged radially between the side wall and the second layer of plies.

13. The spinner of claim 11, wherein the plug includes reinforcing fibers suspended in a matrix material.

14. A fan assembly comprising
a bladed wheel including a hub and a plurality of fan blades coupled to the hub to extend radially outward from the hub, and
a spinner coupled to the hub, the spinner including a unitary filament-wound body having a side wall arranged around a central axis that forms a majority of an exterior radially-outwardly facing surface of the spinner and an aft ring made from composite materials bonded to the side wall of the body, the aft ring including a band that overlaps a radially-outwardly facing portion of the side wall adjacent to the hub and a plurality of fairings that extend outward in a radial direction from the band away from the central axis ahead of each fan blade included in the bladed wheel,
wherein the aft ring is formed from a plurality of segments each arranged to extend around a portion of the diameter of the aft ring,
wherein each segment is arranged to circumferentially overlap a portion of one adjacent segment to form circumferentially overlapping joints between each pair of adjacent segments.

* * * * *